(12) United States Patent
Tarasinski et al.

(10) Patent No.: US 7,431,108 B2
(45) Date of Patent: Oct. 7, 2008

(54) ASSEMBLY FOR THE SELECTION OF A GEAR RATIO OF A POWER TAKE-OFF SHAFT GEARBOX

(75) Inventors: Nicolai Tarasinski, Frankenthal (DE); Marco Reinards, Bleialf (DE)

(73) Assignee: Deere & Company, Moline, IL (US)

( * ) Notice: Subject to any disclaimer, the term of this patent is extended or adjusted under 35 U.S.C. 154(b) by 293 days.

(21) Appl. No.: 11/315,071

(22) Filed: Dec. 22, 2005

(65) Prior Publication Data

US 2006/0196284 A1 Sep. 7, 2006

(30) Foreign Application Priority Data

Jan. 25, 2005 (DE) .......... 10 2005 003 325

(51) Int. Cl.
*B60K 25/08* (2006.01)

(52) U.S. Cl. .................. 180/53.6

(58) Field of Classification Search .......... 180/53.1, 180/53.61, 53.6; 74/335; 701/50; 192/3.58
See application file for complete search history.

(56) References Cited

U.S. PATENT DOCUMENTS

| 6,129,187 | A | * | 10/2000 | Bellanger et al. | .......... 192/3.58 |
|---|---|---|---|---|---|
| 6,134,494 | A | | 10/2000 | Stelzle et al. | .................. 701/50 |
| 6,205,385 | B1 | | 3/2001 | Stelzle et al. | |
| 6,386,303 | B1 | | 5/2002 | Zibuschka et al. | .......... 180/53.3 |
| 6,401,848 | B1 | | 6/2002 | Vu | .............................. 180/53.1 |

FOREIGN PATENT DOCUMENTS

| DE | 102 49 757 | 5/2004 |
|---|---|---|
| DE | 697 27 191 T2 | 11/2004 |
| EP | 0 819 562 | 2/1998 |
| FR | 2 618 288 A1 | 1/1989 |

OTHER PUBLICATIONS

German Search Report dated Feb. 9, 2006.
European Search Report dated May 8, 2006.

* cited by examiner

*Primary Examiner*—Faye M. Fleming

(57) ABSTRACT

An assembly for the selection of the gear ratio of a power take-off shaft gearbox for the drive of a power take-off shaft output of an agricultural vehicle including an actuator for selecting between one of a plurality of gear ratios and a neutral condition. A first input assembly is positioned within an operator's station and is connected to a control assembly for controlling the actuator to allow an operator to select one of the plurality of gear ratios for the power take-off shaft gearbox. A second input assembly is also connected to the control assembly and allows an operator to select one of the plurality of gear ratios for the power take-off shaft gearbox. The second input assembly is positioned at a location remote from the operator's station.

12 Claims, 2 Drawing Sheets

ASSEMBLY FOR THE SELECTION OF A GEAR RATIO OF A POWER TAKE-OFF SHAFT GEARBOX

FIELD OF THE INVENTION

The invention concerns an assembly for the selection of the gear ratio of a power take-off shaft gearbox for driving the power take-off output shaft of an agricultural vehicle.

BACKGROUND OF THE INVENTION

In the state of the art agricultural tractors are equipped with an internal combustion engine that drives both the wheels for the forward propulsion of the tractor during operation and the power take-off shaft that is used for the drive of attached implements, such as ground breaking implements or rotobalers. A power take-off shaft gearbox is positioned between the engine and the power take-off shaft output shaft of the tractor. As a rule such power take-off shaft gearboxes are provided with several gear ratios that can be selected by an operator, that result in desired power take-off shaft rotational speeds at certain engine rotational speeds. The power take-off shaft gearboxes can also be brought into a neutral condition, in which the power take-off shaft can be rotated freely.

In known embodiments, the power take-off shaft gearboxes are shifted mechanically. A shift lever is located at the operator's station of the tractor and is connected at all times with the power take-off shaft gearbox by means of transmission elements, such as, linkages or rope pull or push-pull cable controls. In other power take-off shaft gearboxes the shift lever is located directly at the power take-off shaft gearbox housing, such that the operator must leave the operator's station and move to the rear of the tractor where the power take-off shaft gearbox is located in order to shift the power take-off shaft gear box.

In another example, an input assembly with several keys is arranged at the operator's station and each of the keys is used to select a gear ratio or the neutral position of an electro-hydraulically controlled power take-off shaft gearbox.

In these examples, only a single input assembly is provided with which the operator can select the gear ratio of the power take-off shaft gearbox.

In another prior art tractor, the drive of the power take-off shaft can be turned on and off by a switch located in the operator's cab. A second switch for the control of the drive of the power take-off shaft is located at the rear of the tractor above the fender. Still another example includes an outside key that makes it possible to operate control implements, such as the power take-off shaft from the outside of the operator's cab.

Therefore, there is a need for a shift assembly for the selection, by the operator, of gear ratio of a power take-off shaft gearbox that allows the operator to select a gear ratio for the power shaft take-off shaft gearbox or the neutral position without leaving the operator's station.

SUMMARY OF THE INVENTION

For the selection of the immediate gear ratio or the neutral position, the power take-off shaft gearbox is provided with an actuator actuated by external force that is controlled by a control assembly. A first input assembly is arranged at the operator's station, which is connected with the control assembly and is used for the input of the desired gear ratio of the power take-off shaft gearbox. The control assembly is connected with a second input assembly that is located at an appropriate position on the vehicle at a distance from the operator's station and permits the operator to select at least the neutral position, and possibly also the gear ratio of the power take-off shaft gearbox.

In this way the selection of the particular gear ratio or neutral position of the power take-off shaft gearbox is considerably simplified, since the operator can perform the selection at the operator's station as well as outside of the vehicle.

The most appropriate location for the attachment of the second input assembly is at the rear of the vehicle, for example, within the reach of an operator standing alongside the power take-off shaft output of the power take-off shaft gearbox, particularly at the rear fender of the vehicle, since that is where the operator is positioned when operating implements are coupled and uncoupled. In the instance where an interface for a power take-off shaft is located at the front of the vehicle, a second input assembly for the power take-off shaft could also be located at the front of the vehicle. The input assembly could also be connected by cable or be wireless such that the input assembly can be applied at any location where needed.

The external selection of the gear ratio is particularly advantageous when an operating implement with a power take-off shaft is to be coupled to the vehicle. For this purpose it is useful, depending on the situation, to be able to rotate the power take-off shaft stub shaft on the side of the vehicle in order to be able to apply the articulated shaft (hollow shaft) to the gear teeth of the power take-off shaft stub shaft. However, when the internal combustion engine is running the power take-off shaft stub shaft, as a rule, is retained by a hydraulic brake located in the power take-off shaft gearbox. Therefore, in order to be able to rotate the power take-off shaft stub shaft when the engine is running, the invention permits the power take-off shaft gearbox to be brought into the neutral position, wherein the power take-off shaft stub shaft can be rotated freely by actuating the second input assembly. In another embodiment it is sufficient that the second input assembly can bring the power take-off shaft gearbox into the neutral position.

In a further embodiment, the control assembly is coupled with an external lifting gear actuation assembly of the vehicle, which is used to raise and lower the lifting gear and is already in existence on many agricultural tractors and positioned near the lifting gear on the rear side of the tractor, and usually integrated into the rear fender or arranged above it. In addition, the control assembly receives information regarding the operating condition of the power take-off shaft output. Specifically, the control assembly is supplied with data indicating whether the clutch of the power take-off shaft is engaged or not. If the power take-off shaft is engaged, the inputs of the lifting gear actuation assembly are used in a known manner for the controlling the lifting gear. However, if the power take-off shaft is disengaged, the power take-off shaft gearbox is brought into the neutral position by the control assembly upon an actuation of one of the keys of the lifting gear actuation assembly. In this way the lifting gear actuation assembly is also utilized as a second input assembly to bring the power take-off shaft gearbox into the neutral position. Within the bounds of the concept of the invention, any other desired operating elements located on the outside of the vehicle in the vicinity of the power take-off shaft could be provided with a secondary function that makes it possible to bring the power take-off shaft gearbox into the neutral position, so long as the vehicle is in an operating condition such that the operating element is not required for its primary function.

Since the invention includes a second input assembly for the power take-off shaft gearbox, situations are conceivable in which contradictory inputs are provided. For example, an operator at the operator's station may select a certain gear ratio at the first input assembly, while another person selects the neutral position with the second input assembly. In order to avoid inappropriate conditions of the actuator or even damage to it, the control assembly preferably tests the status of both input assemblies and ignores contradictory inputs.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a side view of a vehicle in the form of a tractor coupled to an operating implement in the shape of a rotobaler; and.

DETAILED DESCRIPTION OF THE INVENTION

Figure 1:
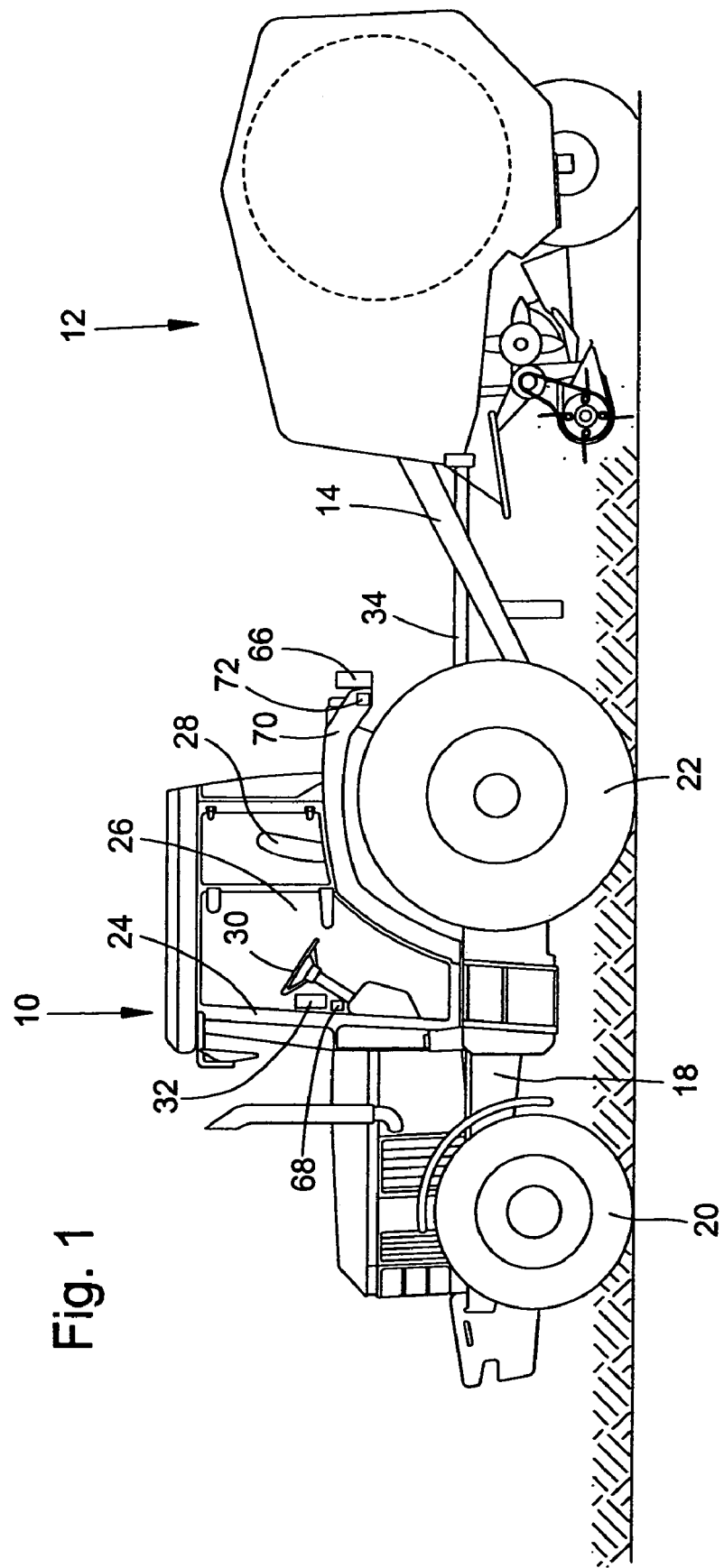

FIG. 1 is a side view of an agricultural vehicle 10, in the form of a tractor, and an operating implement 12, in the form of a rotobaler, coupled to a coupling assembly (not shown) of the vehicle by means of a towbar 14. The vehicle 10 is supported on a support frame 18 carried by steerable front wheels 20 and driven rear wheels 22 and carries a cab 24 in which an operator's station 26 is located. The operator's station 26 includes a seat 28, a steering wheel 30, pedals (not shown) and several input elements within reach of an operator located at the operator's station 26 for the input of functions of the vehicle 10 that can be selected. The latter includes a first input assembly 32.

Figure 2:
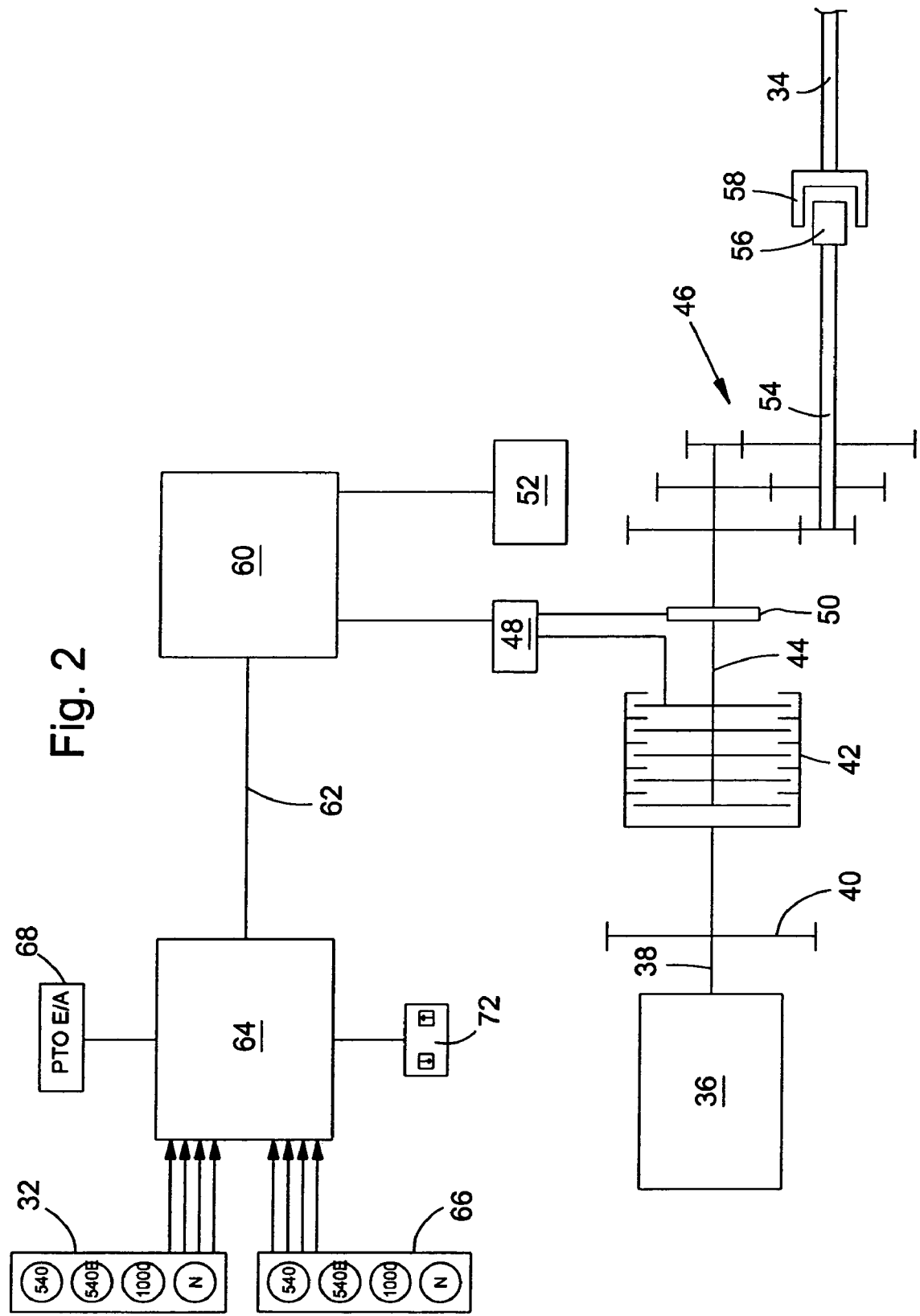
FIG. 2 is a schematic view of the drive-line of the power take-off shaft and the control assembly for the selection of the gear ratio of a power take-off shaft gearbox.

FIG. 2 schematically shows the drive-line of a vehicle 10 for driving a power take-off shaft 34 that is used to drive the elements of the operating implement 12 that can be driven. An internal combustion engine 36, as a rule, a diesel engine, drives a shaft 38 that is used to drive the rear wheels 22 and preferably also the front wheels 20 and, if necessary, also other assemblies of the vehicle 10 that can be driven, such as a compressor of an air conditioning assembly, by means of a gear 40 in a manner known in itself but not shown in any further detail.

The shaft 38 is also connected with a hydraulically actuated clutch 42 that is connected on its output side with an input shaft 44 of a power take-off shaft gearbox 46. The clutch 42 is actuated by means of a valve assembly 48 that is also connected with a brake 50 positioned on the input shaft 44.

The power take-off shaft gearbox 46 is provided with three different gear ratios that can be selected and, hence, includes three pairs of meshing gears. The gear ratio is selected by means of an electro-hydraulically (or electrically) actuated actuator 52 that is actuated by external forces and establishes, for example, by means of sliding coupling devices, which of the three gears arranged on an output shaft 54 of the power take-off shaft gearbox 46 is connected, so as to transmit torque to the power take-off shaft output shaft 54. Alternatively, the actuator 52 could establish which of the three gears arranged on the input shaft 44 is connected, so as to transmit torque to the input shaft 44. The actuator 52 makes possible the selection of three gear ratios where in the present embodiment, the first gear ratio, when the rated rotational speed of the internal combustion engine 36 is 2100 rpm, provides an output shaft 54 speed of 1000 rpm. A second gear ratio provides an output shaft 54 speed of 540 rpm when the engine 36 is operating at a reduced operating speed of 1800 rpm. A third gear ratio, with the rated rotational speed of the internal combustion engine 36 at 2100 rpm, provides an output shaft speed of 540 rpm. In addition, there is the possibility that none of the gears of the power take-off shaft gearbox 46 are coupled to the input shaft 44 or the output shaft 54, thereby placing the power take-off shaft gearbox 46 into a neutral position, wherein the output shaft 54 can be rotated freely even when the brake 50 is applied.

The output shaft 54 is connected with a power take-off shaft output 56 in the form of a power take-off shaft stub shaft, onto which the power take-off shaft 34 of the operating implement, equipped with a hollow shaft end piece 58, can be slid. Preferably, the power take-off shaft 34 is configured as an articulated shaft.

An electronic control assembly 60 is connected with the valve assembly 48 and the actuator 52. Moreover, it is also connected by means of an implement bus 62 (for example, a CAN bus) with an operator interface logic 64 connected to the first input assembly 32. The first input assembly 32 includes four keys that can be pressed, each of which is associated with one of the aforementioned gear ratios and the neutral position of the power take-off shaft gearbox 46. In addition, the operator interface logic 64 is connected to a power take-off shaft switch 68, located within the reach of an operator at the operator's station 26, and to a second input assembly 66.

The first input assembly 32 makes it possible for the operator, by manual actuation of the four keys, to select one of the three gear ratios of the power take-off shaft gearbox 46 or the neutral position. The operator interface logic 64 transmits information regarding the input from the operator by means of the bus 62 to the control assembly 60, which in turn controls the actuator 52 corresponding to the information received. The gear ratio selected at a given time can be displayed for the operator by illuminating the particular key of the input assembly 32.

If the operator brings the power take-off shaft switch 68 into the operating position, the operator interface logic 64 transmits corresponding information to the control assembly 60 over the bus 62, thereby inducing the valve assembly 48 to release the brake 50 and engage the clutch 42. If the operator brings the power take-off shaft switch 68 into the non-operating position, then the operator interface logic 64 analogously transmits corresponding information to the control assembly 60 over the bus 62, thereby inducing the valve assembly 48 to disengage the clutch 52 and apply the brakes 50.

The second input assembly 66 is located at the rear side of the rear fender 70 of the vehicle 10 and is also connected with the operator interface logic 64, by means of separate cables, and over the bus 62 to the control assembly 60. In the embodiment shown, the second input assembly also includes four keys that correspond in their configuration and function to the keys of the first input assembly 32. The operator interface logic 64 tests the signals coming from the first and second input assemblies 32 and 66 for errors, particularly contradictory information inputs, and sends only properly integrated switching signals to the control assembly 60. The second input assembly 66 differs in form and characteristics clearly enough from any other possible operating elements located at the rear of the vehicle 10. A spatially separate configuration is also preferred here.

During the coupling of the operating implement 12 to the vehicle 10, the operator stands at the rear side of the vehicle 10. In the instance where the power take-off shaft output 56 and the hollow shaft end piece 58 of the power take-off shaft 34 from the operating implement 12 are not in an orientation that permits the hollow shaft end piece 58 to be slid onto the power take-off shaft output 56, the operator can induce the power take-off shaft gearbox 46 to move into the neutral position by means of the second input assembly 66. The output shaft 54 can then be rotated without any problem, despite the activated brake 50, in order to bring the output shaft 54 into a position wherein the hollow shaft end piece 58 can be slid onto the power take-off shaft output 56.

In an alternative embodiment the second input assembly 66 includes only one key, thereby only allowing a signal to place the power take-off shaft gearbox 46 in the neutral position.

The second input assembly 66 may have a primary purpose and a secondary purpose. Preferably, the secondary purpose of the second input assembly 66 is to control the gear ratio of the power take-off gearbox 46, with the primary purpose of the second input assembly 66 being as a lifting gear actuation assembly 72. On the rear side of the vehicle a lifting gear actuation assembly 72 is mounted to the rear fender 70. The lifting gear actuation assembly 72 acts as the second input assembly, and is connected to the operator interface logic 64. The electronic control assembly 60 induces a lifting gear (not shown) to raise or lower an additional hitch as a function of any possible inputs from an operator at the lifting gear actuating assembly 72, as long as the power take-off shaft switch 68 is turned on. If, on the other hand, the power take-off shaft switch 68 is turned off, the electronic control assembly 60 induces the actuator 52 to bring the power take-off shaft gearbox 46 into the neutral position upon actuation, by the operator, of one of two keys on the lifting gear actuation assembly 72. Thereby the operator can stand at the rear side of the vehicle 10 and switch the power take-off shaft gearbox 46 into the neutral position by actuating the lifting gear actuation assembly 72.

In accordance with the provisions of the patent statutes, the present invention has been described in what is considered to represent its preferred embodiment. However, it should be noted that the invention can be practiced otherwise than as specifically illustrated and described.

The invention claimed is:

1. An assembly for the selection of the gear ratio of a power take-off shaft gearbox for the drive of a power take-off shaft output of an agricultural vehicle comprising:
    an actuator for selecting one of a plurality of gear ratios and a neutral condition of the power take-off shaft gearbox;
    a control assembly connected to the actuator for controlling the actuator;
    a first input assembly positioned within an operator's station and connected to the control assembly to allow an operator to select one of the plurality of gear ratios for the power take-off shaft gearbox;
    a second input assembly connected to the control assembly to allow an operator to select one of the plurality of gear ratios for the power take-off shaft gearbox, the second input assembly being positioned at a distance from the operator's station.

2. The assembly according to claim 1, wherein the second input assembly is located in the vicinity of a rear fender of the agricultural vehicle, within reach of an operator standing alongside the power take-off shaft output of the power take-off shaft gearbox.

3. The assembly according to claim 1, wherein the second input assembly permits a selection only of the neutral position of the power take-off shaft gearbox.

4. The assembly according to claim 1, wherein the second input assembly has a primary function and a secondary function, the secondary function being to allow selection of the neutral position for the power take-off shaft gearbox, the second input assembly being capable of performing the secondary function only when the agricultural vehicle is in an operating condition not requiring use of the primary function of the second input assembly.

5. The assembly according to claim 4, wherein the primary function of the second input assembly is to control a lifting gear actuating assembly.

6. The assembly according to claim 1, wherein the control assembly is adapted to ignore contradictory, simultaneous inputs from the first input assembly and the second input assembly.

7. An agricultural vehicle comprising:
    a power take-off shaft;
    a power take-off shaft gearbox for driving the power take-off shaft and being shiftable between a plurality of gear ratios and a neutral positon;
    an assembly for the selection of the gear ratio of the power take-off shaft gearbox, the assembly including an actuator for selecting one of the plurality of gear ratios or the neutral condition of the power take-off shaft gearbox, a control assembly connected to the actuator for controlling the actuator, a first input assembly positioned within an operator's station and connected to the control assembly to allow an operator to select one of the plurality of gear ratios for the power take-off shaft gearbox, and a second input assembly connected to the control assembly to allow an operator to select one of the plurality of gear ratios for the power take-off shaft gearbox, the second input assembly being located in a position removed from the operator's station.

8. The agricultural vehicle according to claim 7, wherein the second input assembly is located in the vicinity of a rear fender of the agricultural vehicle, within reach of an operator standing alongside the power take-off shaft output of the power take-off shaft gearbox.

9. The agricultural vehicle according to claim 7, wherein the second input assembly permits a selection only of the neutral position of the power take-off shaft gearbox.

10. The agricultural vehicle according to claim 7, wherein the second input assembly has a primary function and a secondary function, the secondary function being to allow selection of the neutral position for the power take-off shaft gearbox, the second input assembly being capable of performing the secondary function only when the agricultural vehicle is in an operating condition not requiring use of the primary function of the second input assembly.

11. The agricultural vehicle according to claim 10, wherein the primary function of the second input assembly is to control a lifting gear actuating assembly.

12. The agricultural vehicle according to claim 7, wherein the control assembly is adapted to ignore contradictory, simultaneous inputs from the first input assembly and the second input assembly.

* * * * *